US010212162B2

(12) United States Patent
Maria (10) Patent No.: US 10,212,162 B2
(45) Date of Patent: Feb. 19, 2019

(54) COMMUNICATION GATEWAY FOR FACILITATING COMMUNICATIONS WITH A SUPERVISORY CONTROL AND DATA ACQUISITION SYSTEM

(71) Applicant: AT&T Mobility II LLC, Atlanta, GA (US)

(72) Inventor: Arturo Maria, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 14/552,194

(22) Filed: Nov. 24, 2014

(65) Prior Publication Data

US 2015/0082385 A1    Mar. 19, 2015

Related U.S. Application Data

(63) Continuation of application No. 13/217,545, filed on Aug. 25, 2011, now Pat. No. 8,908,531.

(51) Int. Cl.
*H04L 29/06* (2006.01)
*H04W 24/10* (2009.01)
*H04L 29/08* (2006.01)
*H04W 24/08* (2009.01)

(52) U.S. Cl.
CPC .............. *H04L 63/10* (2013.01); *H04L 67/12* (2013.01); *H04L 67/2823* (2013.01); *H04L 69/08* (2013.01); *H04W 24/10* (2013.01); *G05B 2219/24215* (2013.01); *H04W 24/08* (2013.01)

(58) Field of Classification Search
CPC ......... H04L 69/04; H04L 69/18; H04L 63/10; H04L 67/2823
USPC ....................................................... 726/6, 12
See application file for complete search history.

(56) References Cited

U.S. PATENT DOCUMENTS

| | | | | |
|---|---|---|---|---|
| 5,828,846 A | * | 10/1998 | Kirby et al. | 709/238 |
| 6,570,974 B1 | * | 5/2003 | Gerszberg | H04M 3/4931 348/E7.07 |
| 7,673,048 B1 | * | 3/2010 | O'Toole, Jr. | H04L 12/4633 370/229 |
| 7,882,254 B2 | * | 2/2011 | Choi | H04L 69/08 370/466 |
| 8,176,532 B1 | * | 5/2012 | Cook | H04L 63/10 726/11 |
| 8,219,214 B1 | | 7/2012 | Mimlitz | |
| 8,335,596 B2 | | 12/2012 | Raman et al. | |

(Continued)

OTHER PUBLICATIONS

Maria, Arturo, U.S. Appl. No. 12/941,250, filed Nov. 8, 2010, entitled "GGSN Front End Processor (GFEP) System for SCADA Inter-Domain Communications".

(Continued)

*Primary Examiner* — Eric W Shepperd
*Assistant Examiner* — Peiliang Pan
(74) *Attorney, Agent, or Firm* — Hartman & Citrin LLC (57) ABSTRACT

Transfer of data between at least one supervisory control and data acquisition (SCADA) device and an advanced metering infrastructure (AMI) device via a wireless communication network is facilitated. The data is used for monitoring and/or controlling the AMI device. A protocol conversion of the data is performed to facilitate transfer of the data between the SCADA device and the AMI device as data packets via a packet data network gateway and a wireless communications network.

20 Claims, 7 Drawing Sheets

(56) References Cited

U.S. PATENT DOCUMENTS

| | | | |
|---|---|---|---|
| 8,406,764 B1* | 3/2013 | Bennett | H04W 36/026 370/230 |
| 9,300,137 B2* | 3/2016 | Cherian | H02J 3/00 |
| 2002/0055990 A1* | 5/2002 | Vaman | H04L 12/5695 709/220 |
| 2002/0090001 A1 | 7/2002 | Beckwith | |
| 2003/0123479 A1* | 7/2003 | Lee et al. | 370/466 |
| 2003/0147420 A1 | 8/2003 | Beckwith | |
| 2004/0162902 A1* | 8/2004 | Davis | H02J 13/0075 709/227 |
| 2005/0120091 A1* | 6/2005 | Casais et al. | 709/217 |
| 2005/0175031 A1 | 8/2005 | Harley | |
| 2005/0208943 A1* | 9/2005 | Pecen | H04W 36/0066 455/436 |
| 2005/0271128 A1* | 12/2005 | Williams | H04L 43/0817 375/222 |
| 2005/0285734 A1* | 12/2005 | Sheynman | H04L 63/0442 340/539.21 |
| 2006/0034329 A1 | 2/2006 | Miller et al. | |
| 2006/0052099 A1 | 3/2006 | Parker | |
| 2006/0094400 A1* | 5/2006 | Beachem | H04L 63/101 455/410 |
| 2006/0111135 A1* | 5/2006 | Gray et al. | 455/519 |
| 2006/0117295 A1* | 6/2006 | Wu | G05B 19/00 717/104 |
| 2006/0133329 A1* | 6/2006 | Lewis | H04W 12/06 370/338 |
| 2006/0155814 A1* | 7/2006 | Bennett et al. | 709/207 |
| 2006/0176874 A1* | 8/2006 | Shaffer | H04M 3/42263 370/352 |
| 2007/0210916 A1* | 9/2007 | Ogushi | G06Q 10/0875 340/531 |
| 2008/0034420 A1* | 2/2008 | Chang | G06F 17/30893 726/15 |
| 2008/0052757 A1* | 2/2008 | Gulati | H04L 41/0809 726/1 |
| 2008/0109446 A1* | 5/2008 | Wang | 707/10 |
| 2008/0183317 A1* | 7/2008 | Kim | G01D 4/002 700/90 |
| 2008/0204961 A1* | 8/2008 | O'Leary | H02H 3/006 361/104 |
| 2008/0316048 A1* | 12/2008 | Abdallah | G01V 11/002 340/854.6 |
| 2009/0028184 A1 | 1/2009 | Carpman et al. | |
| 2009/0046400 A1* | 2/2009 | McCarthy | H02H 3/063 361/42 |
| 2009/0138100 A1 | 5/2009 | Khorramshahi | |
| 2009/0144425 A1 | 6/2009 | Marr et al. | |
| 2009/0228956 A1* | 9/2009 | He et al. | 726/1 |
| 2009/0254655 A1* | 10/2009 | Kidwell et al. | 709/224 |
| 2009/0290275 A1* | 11/2009 | Staszesky | H02H 7/30 361/63 |
| 2010/0020724 A1* | 1/2010 | Wimmer | H02H 1/0061 370/254 |
| 2010/0039993 A1* | 2/2010 | Ramankutty et al. | 370/328 |
| 2010/0050017 A1* | 2/2010 | Almadi | E21B 47/12 714/15 |
| 2010/0094981 A1* | 4/2010 | Cordray | G06F 15/173 709/222 |
| 2010/0128601 A1* | 5/2010 | Bennett | H04L 45/00 370/225 |
| 2010/0145479 A1* | 6/2010 | Griffiths | G01D 21/00 700/17 |
| 2010/0158026 A1 | 6/2010 | Valmikarri et al. | |
| 2010/0195574 A1* | 8/2010 | Richeson et al. | 370/328 |
| 2010/0234023 A1* | 9/2010 | Bae | H04W 76/022 455/434 |
| 2010/0260125 A1 | 10/2010 | Lee et al. | |
| 2010/0262664 A1 | 10/2010 | Brown et al. | |
| 2010/0278187 A1* | 11/2010 | Hart et al. | 370/401 |
| 2010/0292856 A1 | 11/2010 | Fujita | |
| 2011/0010016 A1 | 1/2011 | Giroti | |
| 2011/0035065 A1* | 2/2011 | Schweitzer | H02J 13/0062 700/286 |
| 2011/0038322 A1 | 2/2011 | Liang | |
| 2011/0047264 A1* | 2/2011 | Hilpert | H04L 41/145 709/224 |
| 2011/0061014 A1 | 3/2011 | Frader-Thompson et al. | |
| 2011/0075655 A1 | 3/2011 | Sahin et al. | |
| 2011/0063126 A1 | 5/2011 | Kennedy et al. | |
| 2011/0158244 A1* | 6/2011 | Long | H04L 12/66 370/401 |
| 2011/0196546 A1* | 8/2011 | Muller et al. | 700/295 |
| 2011/0228750 A1* | 9/2011 | Tomici | H04W 8/082 370/338 |
| 2011/0269421 A1* | 11/2011 | Moore et al. | 455/406 |
| 2011/0303310 A1 | 12/2011 | Kilcpera | |
| 2011/0320058 A1* | 12/2011 | Rietmann | H02J 3/006 700/297 |
| 2012/0016528 A1* | 1/2012 | Raman | G06F 9/5094 700/291 |
| 2012/0047270 A1 | 2/2012 | Chandrasekaran et al. | |
| 2012/0063415 A1 | 3/2012 | Yee | |
| 2012/0102240 A1* | 4/2012 | Wei | H04L 12/403 710/30 |
| 2012/0144187 A1* | 6/2012 | Wei et al. | 713/152 |
| 2012/0198441 A1* | 8/2012 | Mahdavi | G06F 9/455 718/1 |
| 2012/0284790 A1* | 11/2012 | Bhargava | 726/22 |
| 2013/0075484 A1* | 3/2013 | Rhee | G01D 4/004 236/1 F |

OTHER PUBLICATIONS

Office Action dated Jan. 8, 2013 in U.S. Appl. No. 12/941,250.
Notice of Allowance dated May 9, 2013 in U.S. Appl. No. 12/941,250.

* cited by examiner

COMMUNICATION GATEWAY FOR FACILITATING COMMUNICATIONS WITH A SUPERVISORY CONTROL AND DATA ACQUISITION SYSTEM

CROSS-REFERENCE TO RELATED APPLICATIONS

This application is a continuation of U.S. patent application Ser. No. 13/217,545, filed Aug. 25, 2011, now U.S. Pat. No. 8,908,531.

BACKGROUND

The embodiments presented herein relate generally to supervisory control and data acquisition systems and, more particularly, to communication with a supervisory control and data acquisition system.

Supervisory control and data acquisition (SCADA) systems monitor and control dispersed assets involved in industrial, infrastructure, or facility-based processes. SCADA systems are used to monitor and control industrial processes, such as manufacturing, production, power generation, fabrication, refining, and the like. Many public and private infrastructures rely on SCADA systems for monitoring and controlling processes, such as water treatment and distribution, wastewater collection and treatment, oil distribution, natural gas distribution, electric power transmission and distribution, and the like. Facilities, such as buildings, airports, ships, space stations, private homes, communities, and the like also sometime rely on SCADA systems to monitor and control security access, energy consumption, and heating, ventilation, and air conditioning (HVAC) systems, for example.

SCADA systems typically include a control center. SCADA control centers include a human machine interface (HMI) by which a human operator can observe process data and provide input for remote control of a process if necessary, databases for storing historical process data, and servers for communicating via communication routers with field deployments of SCADA devices, such as remote telemetry units (RTUs).

The RTUs connect to physical equipment, such as meters, sensors, switches, valves, probes, and the like. RTUs convert electrical signals from the physical equipment to digital values, such as to identify the open/closed status from a switch or a valve, and conduct measurements, such as of pressure, flow, voltage, or current.

The introduction of the Advanced Metering Infrastructure (AMI) presents opportunities and challenges in terms of supervision and control by SCADA systems. The AMI infrastructure includes communications networks and database systems that will modernize the electric grid and provide important benefits to electric companies and consumers. AMI involves two-way communications with "smart" meters and other energy management devices (collectively referred to herein as "AMI devices").

SUMMARY

According to one exemplary embodiment, a system for facilitating transfer of data intended for monitoring and/or controlling at least one advanced metering infrastructure (AMI) device includes a supervisory control and data acquisition (SCADA) gateway processor. The SCADA gateway processor is configured to perform a protocol conversion of the data to facilitate transfer of the data between at least one SCADA device and the AMI device as data packets via a packet data network gateway and a wireless communications network.

According to another exemplary embodiment, a method for facilitating transfer of data includes performing, via a supervisory control and data acquisition (SCADA) gateway, a protocol conversion of data intended for at least one of monitoring and controlling at least one advanced metering infrastructure (AMI) device. The protocol conversion is performed to facilitate transfer of the data between at least one SCADA device and the AMI device as data packets via a packet data network gateway and a wireless communications network.

According to another exemplary embodiment, a non-transitory computer readable storage medium has instructions encoded thereon. When executed by a processor, the instructions perform acts including performing a protocol conversion of data intended for at least one of monitoring and controlling at least one advanced metering infrastructure (AMI) device to facilitate transfer of the data between at least one SCADA device and the AMI device as data packets via a packet data network gateway and a wireless communications network.

DETAILED DESCRIPTION

As required, detailed embodiments are disclosed herein. It must be understood that the disclosed embodiments are merely exemplary examples that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials, or methods have not been described in detail in order to avoid obscuring the embodiments disclosed herein. Therefore, specific structural and functional details disclosed herein are not to be interpreted as limiting, but merely as a basis for the claims and as a representative basis for teaching one skilled in the art to variously employ the disclosed embodiments.

Typical Network Configuration

Figure 1:
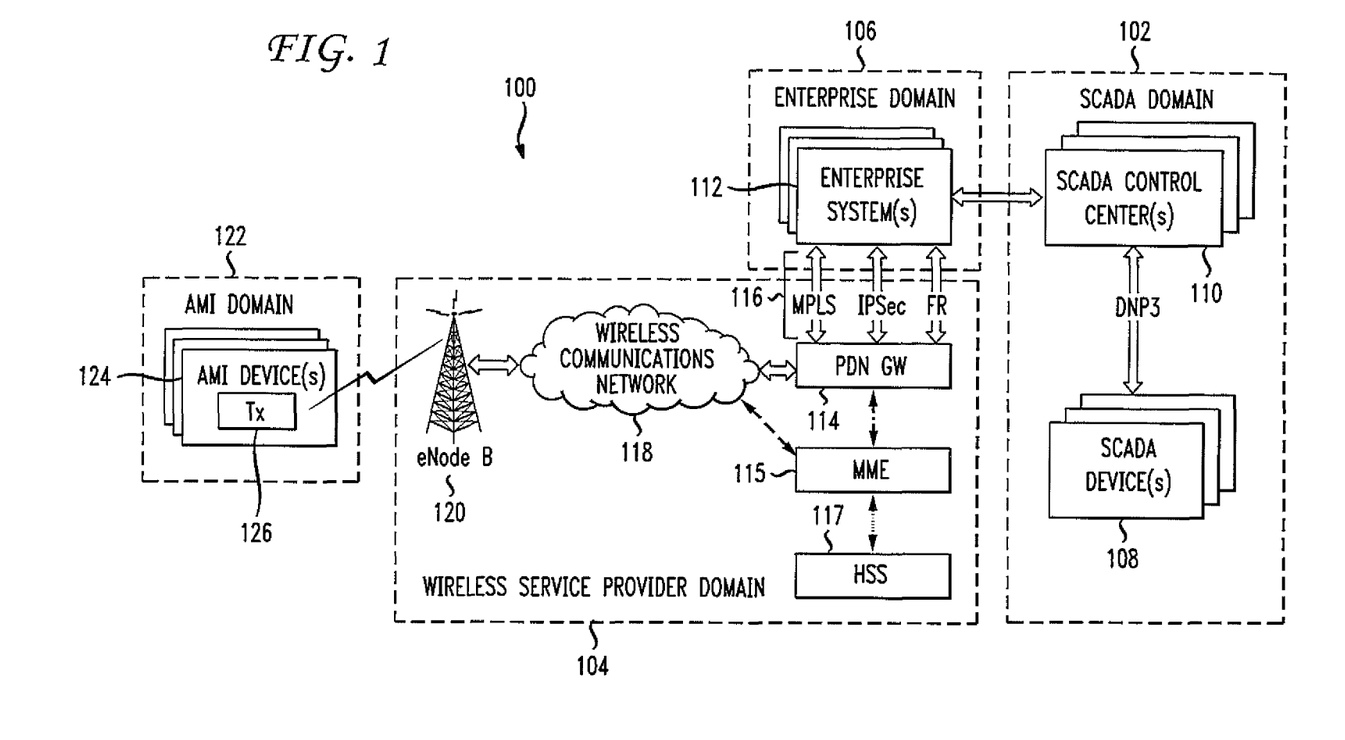
FIG. 1 schematically illustrates a network for facilitating communications between a Supervisory Control and Data Acquisition (SCADA) domain and a wireless service provider domain, according to a typical network configuration.

Referring now to the drawings in which like numerals represent like elements throughout the several figures, FIG. 1 schematically illustrates a typical network 100 for facilitating inter-domain communications between a Supervisory Control and Data Acquisition (SCADA) domain 102 and a wireless service provider domain 104 via an enterprise domain 106. In this typical network configuration, one or more SCADA devices 108 are configured to communicate with one or more SCADA control centers 110 which, in turn, communicate with one or more enterprise systems 112 operating in the enterprise domain 106. The enterprise systems 112 communicate with the wireless service provider domain 104 and, particularly, a Packet Data Network Gateway (PDN GW) 114, via various mechanisms 116, such as multiprotocol label switching (MPLS), frame relay, or Internet Protocol Security (IPSec). The PDN GW 114 provides connectivity between enterprise data networks (not shown) of the enterprise domain 106 and the wireless service provider domain 104. The PDN GW 114 may also provide connectivity to public data networks, such as the Internet (not shown).

The PDN GW 114 interfaces with other network elements of the wireless communications network 118, such as core circuit network elements and core packet network elements. The PDN GW 114 exchanges packet data with network elements of the wireless communication network 118 and exchanges control signals with a Mobile Management Entity (MME) 115. The MME 115, in turn, exchanges control signals with a Home Subscriber Server (HSS) 117. The PDN GW 114, MME 115, and HSS 117 are, in some embodiments, part of a wireless communications network 118, although they are illustrated as separate elements for convenience.

The wireless communications network 118 may include one or more networks operating using telecommunications standards, such as Long Term Evolution (LTE) and various other 4G and greater generation technologies, to facilitate transmission of data received at the PDN GW 114 from the SCADA devices 108 via the SCADA domain 102 and the enterprise domain 106 to the wireless service provider domain 104. Although the embodiments described herein are directed to networks including LTE and other 4G network technologies, the wireless network 118 may also include components that are part of various other 2G, 2.5G, 3G, 4G, and greater generation networks. Examples of such networks include networks using the Global System for Mobile communications (GSM) and a Universal Mobile Telecommunications System (UMTS). The wireless communications network 118 may alternatively or additionally use any existing, developing, or yet to be developed telecommunications technologies. Some examples of other suitable telecommunications technologies include, but are not limited to, networks utilizing Time Division Multiple Access (TDMA), Frequency Division Multiple Access (FDMA), Wideband Code Division Multiple Access (WCDMA), CDMA2000, Orthogonal Frequency Division Multiplexing (OFDM), LTE, and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSPA) protocol family such as High-Speed Downlink Packet Access (HSDPA), Enhanced Uplink (EUL) or otherwise termed High-Speed Uplink Packet Access (HSUPA), Evolved HSPA (HSPA+), and various other current and future data bearers.

The wireless communications network 118 also interfaces with one or more radio access networks (RANS) 120, which, in turn, are in communication with an advanced metering infrastructure (AMI) domain 122 and, particularly, with one or more AMI devices 124 via respective AMI device transceivers 126. The RAN 120 is configured in accordance with the wireless telecommunications standards supported by the wireless communications network 118. As illustrated in FIG. 1, the RAN 120 may be implemented with an eNodeB. The various domains 102, 104, 106, 122 are now described in greater detail.

The SCADA domain 102 includes systems that monitor and control dispersed assets involved in industrial, infrastructure, or facility-based processes. To that end, the illustrated SCADA domain 102 includes one or more control centers 110, each of which includes one or more human machine interfaces (HMIs), such as computer terminals, by which human operators can observe process data and provide input for remote control and monitoring of a process. The control centers 110 also include databases for storing process data. The control centers 110 also include servers for communicating via communication routers with field deployments of the SCADA devices 108. Communication between the control centers 110 and the SCADA devices 108 may be facilitated by an ASYNC-based protocol, such as Distributed Network Protocol (DNP) version 3, as illustrated, or other protocols such as Modbus, Modbus X, or Multispeak. Communications between the SCADA control centers 110 and the SCADA devices 108 are typically handled by dedicated lines.

The SCADA devices 108 are used to automate processes for which human control is impractical, impossible, or costly, for example, via human meter readers. The SCADA devices 108 may be used in association with electric power generation, transmission, and/or distribution. For example, electric utilities typically use SCADA devices to detect current flow and line voltage, to monitor the operation of circuit breakers, and to manipulate online and offline settings for the power grid. The SCADA devices 108 may be used in association with water and sewage treatment and/or distribution. For example, state and municipal water utilities typically use SCADA devices to monitor and regulate water flow, reservoir levels, pipe pressure, and like factors. The SCADA devices 108 may also be used to control heating, ventilation, and air conditioning (HVAC) systems, refrigeration units, lighting systems, security systems, entry systems, defense systems, and the like. Other use cases for the SCADA devices 108 include, for example, monitoring and quality control of manufacturing processes, fabrication processes, refining processes, and regulation of automation units and robotic systems. The SCADA devices 108 may also be used in transit functions such as to regulate electricity in subways, trams, and trolley buses, as well as other transit functions such as to automate traffic signals for rail systems, track and locate trains and buses, control railroad crossing gates, regulate traffic lights, control traffic flow, and detect out-of-order signals from traffic lights. The SCADA devices 108 are also useful in managing, monitoring, and/or controlling other equipment types known to those skilled in the art.

Referring now to the enterprise domain 106, the enterprise systems 112 include systems (e.g., servers, databases, billing system, charging system, customer service system, and the like) of enterprises such as utilities, manufacturers, transit authorities, communications service providers, and others that utilize SCADA devices for monitoring and controlling remote assets. The enterprise domain 106 also includes enterprise networks (not shown) to facilitate communications among the enterprise systems 112, with external data networks, such as the Internet, and the wireless service provider domain 104 via the PDN GW 114.

The wireless service provider domain 104 provides wireless services to postpaid and/or prepaid customers in addition to facilitating wireless data communications between the AMI domain 122 and the enterprise domain 106, the latter operating as an intermediary to the SCADA domain 102.

The AMI domain 122 includes the AMI devices 124, such as devices configured to measure, collect, and analyze processes, for example, the usage of a metered utility provided by an enterprise of the enterprise domain 106 and communicate data associated therewith via the respective AMI device transceivers 126 to the wireless service provider domain 104 through the RAN 120 and ultimately back to the SCADA domain 102. The AMI devices 124 include, e.g., electric meters, gas meters, heat meters, water meters, and various other metering devices, sensors, smart grid devices, and the like.

Presently, in order for AMI devices, such as the illustrated AMI devices 124 in the AMI domain 122, to communicate with the SCADA devices 108 in the SCADA domain 102, data transmissions must traverse wire line connections or, in the illustrated example, the wireless service provider domain 104 via the PDN GW 114 to the enterprise systems 112 in the enterprise domain 106, and the SCADA control centers 110 in the SCADA domain 102. That is, there is no inter-domain communications capability directly between the SCADA domain 102 and the wireless service provider domain 104. This can cause latency concerns, interoperability problems, and increased cost due to the number of systems needed to be maintained to facilitate such communications, among other problems.

According to exemplary embodiments, a SCADA gateway is provided for networks, such as LTE and other $4^{th}$ generation networks, that provides for communications between components of a SCADA system. The gateway performs protocol translations and allows direct communications between AMI devices, such as smart meters, residing in a wireless network, and SCADA devices, residing in a SCADA domain and/or in the wireless network, without requiring that the communications go through SCADA control servers residing in a utility's information systems domain. Exemplary embodiments are described in detail below.

Network Configuration for Inter-Domain Communication

Figure 2:
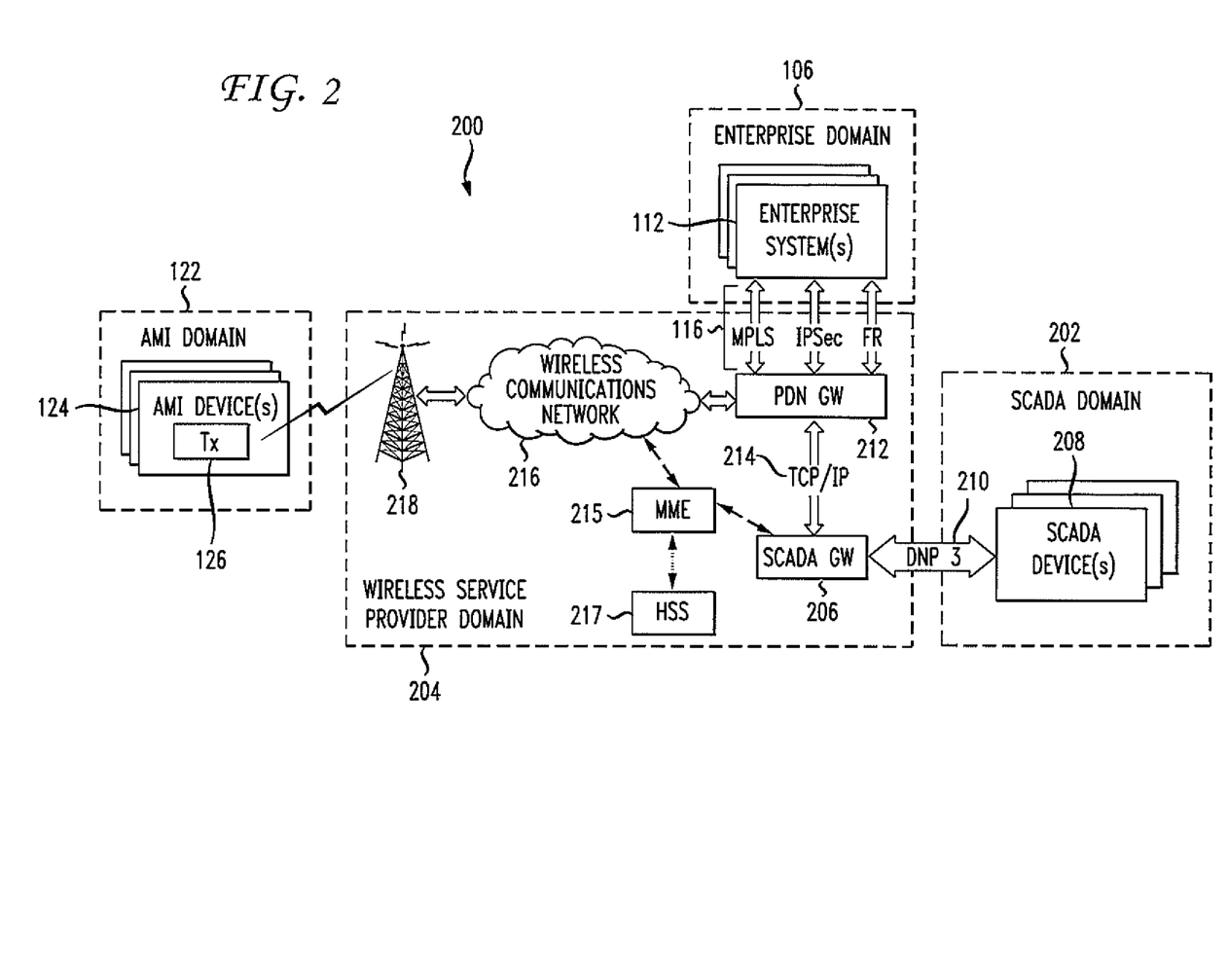
FIG. 2 schematically illustrates a network for facilitating communications between a SCADA domain and a wireless service provider domain via a SCADA gateway, according to one embodiment.

Turning now to FIG. 2, a network 200 for facilitating inter-domain communications directly between a SCADA domain 202 and a wireless service provider domain 204 via a SCADA GW 206 is illustrated, according to one embodiment.

The SCADA domain 202 includes one or more SCADA devices 208 that are similar to those described above with reference to the SCADA devices 108 of FIG. 1. Instead of interfacing with a SCADA control center (e.g., the SCADA control center 110), the SCADA devices 208 are configured to interface with the SCADA GW 206 directly via a data link interface 210, thereby bypassing the need for a SCADA control center and further intermediate communications through the enterprise domain 106. The SCADA GW 206 performs appropriate protocol conversion at layer 2, the data link layer of the Open Systems Interconnection (OSI) model. In particular, the SCADA GW 206 converts communications received from the SCADA devices 208 according to DNP3, as illustrated, or other protocols, such as Modbus, Modbus X, Multispeak, or similar protocol to another data link protocol useable by the PDN GW 212, such as a data link layer protocol of the Internet Protocol Suite (TCP/IP), as in the illustrated embodiment. The SCADA GW 206, in some embodiments, includes an embedded SCADA application to perform the protocol conversion.

The PDN GW 212, like the PDN GW 114 of FIG. 1, can communicate with the enterprise domain 106, as needed, using the mechanisms 116, such as MPLS, frame relay, and/or IPSec. The PDN GW 212, also like the PDN GW 114, in some embodiments, is part of a wireless communications network, which, in the illustrated embodiment, is the wireless communications network 216. Functionally, with respect to communications to and from the enterprise domain 106 and to and from the wireless communications network 216, the PDN GW 212 is the same as the PDN GW 114. The PDN GW 212, however, may include additional functionality to interface with the SCADA GW 206 for communicating data received from the SCADA devices 208 and directed to the SCADA devices 208 from the AMI domain 122 without the need for a SCADA control center or intermediate communications through the enterprise domain 106.

In the illustrated embodiment, the SCADA GW 206 interfaces with a single PDN GW 212 via a data link interface 214 in a packet data network. In other embodiments, the SCADA GW 206 may alternatively interface with two or more PDN GWs to facilitate inter-domain communications between the SCADA domain 202 and the wireless service provider domain 204. In these embodiments, some of the PDN GWs may be geographically dispersed while others may be co-located to facilitate access within the coverage area of the wireless communications network 216. Multiple SCADA GW systems, each configured to interface with one or more PDN GWs, are also contemplated.

Although shown as a separate element for ease of explanation, the SCADA GW 206 may be physically co-located within a chassis shared with components of the PDN GW 212 or the PDN GW 212 may otherwise consider the SCADA GW 206 as functionally part of the PDN GW 212 although the SCADA GW 206 is in some embodiments not physically co-located with the PDN GW 212. The SCADA GW 206 may share software and/or hardware with the PDN GW 212 for performing the functions of a SCADA GW as described herein. According to exemplary embodiments, the SCADA GW 206 may share a network identity with the PDN GW 212 and may be logically associated with a PDN GW 212 rather than being in communication with the PDN GW 212.

SCADA GW systems may be shared among various enterprises engaged in remote monitoring and control via the SCADA devices 208 and the AMI devices 124 or may be dedicated to particular enterprises. In some embodiments, the SCADA GW systems may be provided by a wireless service provider as a value-add, which may garner higher fees for wireless data transmission via a SCADA GW system as opposed to the typical configuration described above with reference to FIG. 1.

The PDN GW 212 exchanges packet data with network elements of the wireless communication network 216 and exchanges control signals with a MME 215. The MME 215, in turn, exchanges control signals with a HSS 217. The PDN GW 212, MME 215, and HSS 217 are, in some embodiments, part of the wireless communications network 216, although they are illustrated as separate elements for convenience.

The PDN GW 212 interfaces with other network elements of the wireless communications network 216, such as core circuit network elements and core packet network elements, as described in greater detail herein below with reference to FIG. 8.

The wireless communications network 216 may operate using telecommunications standards, such as LTE, to facilitate the exchange of data received at the PDN GW 212 to/from the SCADA devices 208 via the SCADA GW 206 through the wireless service provider domain 204 to/from the AMI devices 124 of the AMI domain 122. The wireless communications network 216 may alternatively or additionally use any existing, developing, or yet to be developed telecommunications technologies, such as those described above with respect to wireless communications network 118.

The wireless communications network 216 also interfaces with one or more radio access networks (RANs) 218, which, in turn, are in communication with the AMI domain 122 and, particularly, with the AMI devices 124 via one or more respective AMI device transceivers 126. The RAN 218 is configured in accordance with the wireless telecommunications standards supported by the wireless communications network 216. In an exemplary embodiment, the RAN 218 may be implemented as an eNodeB.

Intra-Domain Network Configuration

Figure 3:
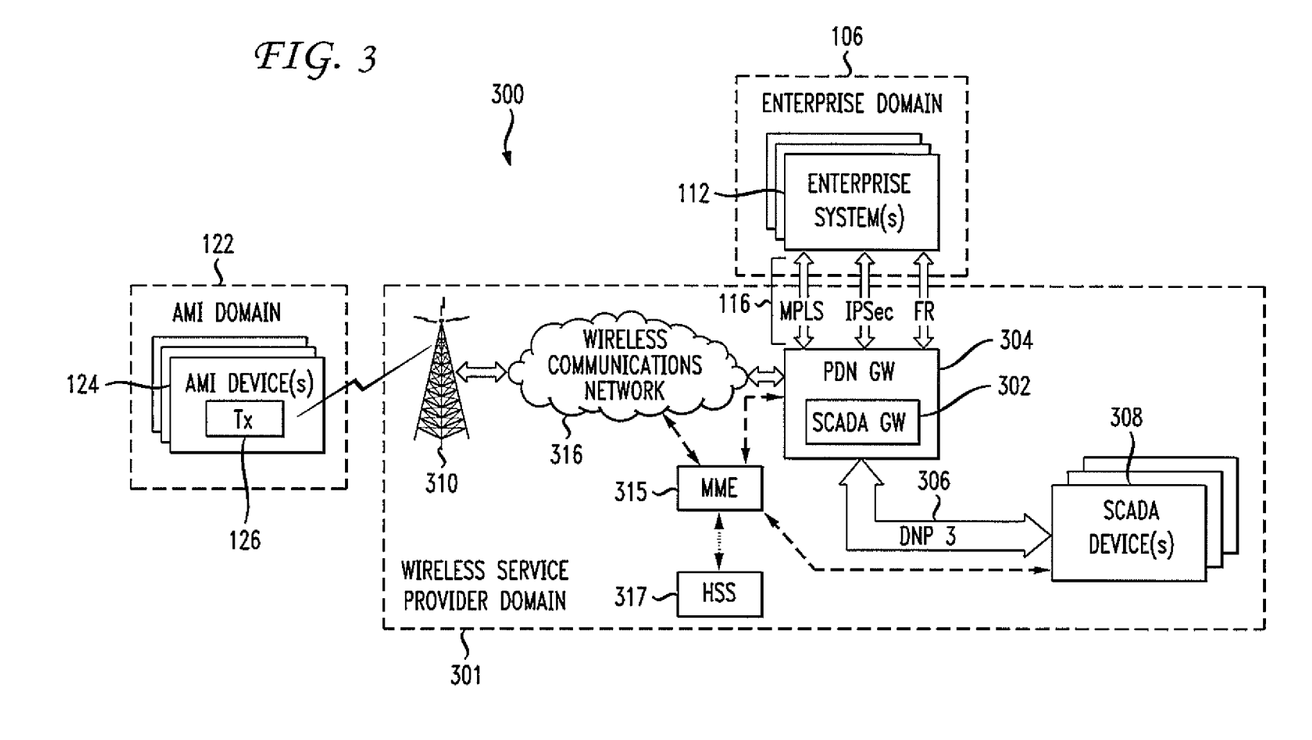
FIG. 3 schematically illustrates a network for facilitating intranetwork communications for SCADA devices within a wireless service provider domain via a SCADA gateway, according to another embodiment.

Turning now to FIG. 3, a network 300 for facilitating intra-domain communications with SCADA devices 308 in a wireless service provider domain 301 via a SCADA GW 302 is illustrated, according to an embodiment.

In the illustrated embodiment, the SCADA GW 302 functions like the SCADA GW 206 of FIG. 2. The SCADA GW 302 converts data received from the SCADA devices 308 via a DNP3 data link 306 or another data link layer protocol for use by the PDN GW 304 in providing the data to a wireless communications network 316. The PDN GW 304, like the PDN GW 114 of FIG. 1 and the PDN GW 212 of FIG. 2, can communicate with the enterprise domain 106, as needed, using the mechanisms 116, such as MPLS, frame relay, and/or IPSec. The PDN GW 304 is also operatively coupled to a wireless communications network, which, in the illustrated embodiment, is a wireless communications network 316. Functionally, with respect to communications to and from the enterprise domain 106 and to and from the wireless communications network 316, the PDN GW 304 is the same as the PDN GW 114. The PDN GW 304, however, includes additional functionality provided by the SCADA GW 302 for communicating data to/from the SCADA devices 308 and the AMI devices 124 without the need for a SCADA control center or intermediate communications through the enterprise domain 106.

In the illustrated embodiment, the SCADA GW 302 is part of a single PDN GW 304. In other embodiments, the SCADA GW 302 may alternatively interface with the PDN GW 304 via data link interface. Also, the SCADA GW 302 may interface with two or more PDN GWs to facilitate intra-domain communications. In these embodiments, some of the PDN GWs may be geographically dispersed while others may be co-located to facilitate access within the coverage area of the wireless communications network 316. Multiple SCADA GW systems, each configured to interface with one or more PDN GWs, are also contemplated.

The SCADA GW 302 may be physically co-located within a chassis shared with components of the PDN GW 304, or the PDN GW 304 may otherwise consider the SCADA GW 302 as functionally part of the PDN GW 304 although the SCADA GW 302 is in some embodiments not physically co-located with the PDN GW 304. The SCADA GW 302 may share software and/or hardware with the PDN GW 304 for performing the functions of a SCADA GW as described herein. According to exemplary embodiments, the SCADA GW 302 may share a network identity with the PDN GW 304 and may be logically associated with a PDN GW 304 rather than being in communication with the PDN GW 304.

SCADA GW systems may be shared among various enterprises engaged in remote monitoring and control via the SCADA devices 308 and the AMI devices 124 or may be dedicated to particular enterprises. In some embodiments, the SCADA GW systems may be provided by a wireless service provider as a value-add, which may garner higher fees for wireless data transmission via a SCADA GW system as opposed to the typical configuration described above with reference to FIG. 1.

The PDN GW 304 exchanges packet data with network elements of the wireless communications network 316 and exchanges control signals with a MME 315. The MME 315, in turn, exchanges control signals with a HSS 317. The PDN GW 304, MME 315, and HSS 317 are, in some embodiments, part of the wireless communications network 316, although they are illustrated as separate elements for convenience.

The PDN GW 304 interfaces with other network elements of the wireless communications network 316, such as core circuit network elements and core packet network elements, as described in greater detail herein below with reference to FIG. 8.

The wireless communications network 316 may operate using telecommunications standards, such as LTE, to facilitate exchange of data received at the PDN GW 304 to/from the SCADA devices 308 via the SCADA GW 302 through the wireless service provider domain 301 to/from the AMI devices 124 of the AMI domain 122. The wireless communications network 316 may alternatively or additionally use any existing, developing, or yet to be developed telecommunications technologies, such as those described above with reference to the wireless communications network 118.

The wireless communications network 316 also interfaces with one or more radio access networks (RANs) 310, which, in turn, are in communication with the AMI domain 122 and, particularly, with the AMI devices 124 via one or more respective AMI device transceivers 126. The RAN 310 is configured in accordance with the wireless telecommunications standards supported by the wireless communications network 316. According to an exemplary embodiment, the RAN 310 may be implemented with an eNode B.

Exemplary SCADA GW System Architecture

As described above in connection with FIGS. 2 and 3, a SCADA GW system, illustrated as the SCADA GW 206 and the SCADA GW 302, respectively, facilitates direct connectivity between a wireless service provider domain and SCADA devices (whether in a SCADA domain or within the wireless service provider domain). The SCADA GW system may be embodied as a discrete network element or a logically combined SCADA GW/PDN GW component. In either case, the SCADA GW system includes various components described herein below with reference to FIG. 4.

Figure 4:
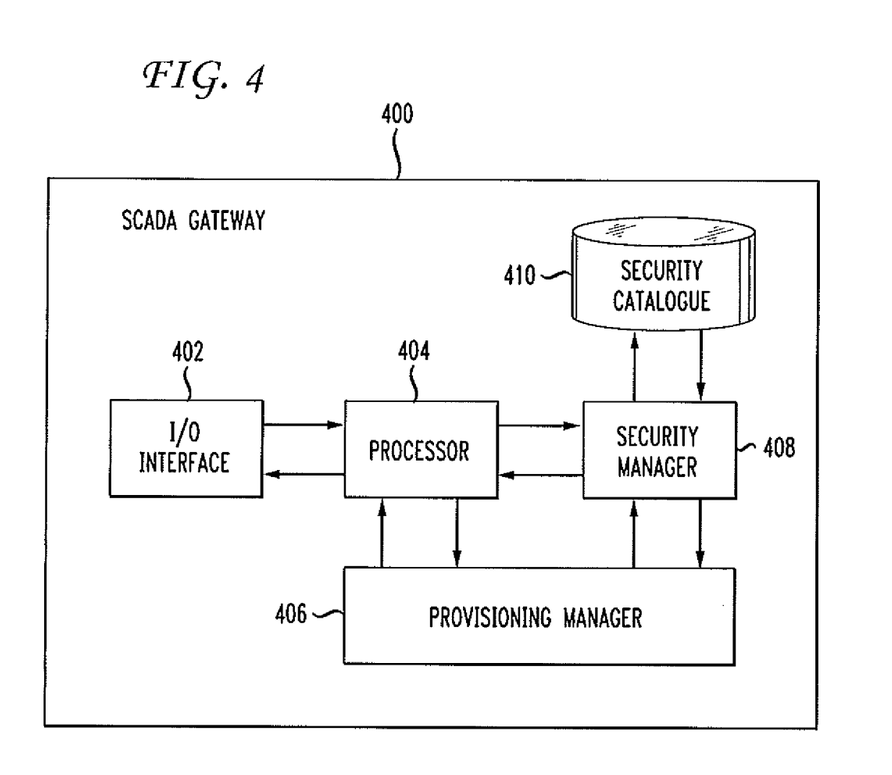
FIG. 4 schematically illustrates a SCADA gateway architecture, according to one embodiment.

Referring now to FIG. 4, architecture of an exemplary SCADA GW system 400 and components thereof are illustrated, according to one embodiment. The SCADA GW system 400 includes an input/output (I/O) interface 402 that is in communication with a SCADA GW processor 404. The SCADA GW processor 404 is in communication with a SCADA GW provisioning manager 406 and a SCADA GW security manager 408, which, in turn, is in communication with a SCADA GW security catalogue database 410.

The I/O interface 402 receives data directly from one or more SCADA devices and delivers data converted by the SCADA GW processor 404, executing computer-readable instructions stored in a memory (not shown expressly) associated with the processor 404, to one or more PDN GWs. The I/O interface 402 also receives data from one or more PDN GWs and delivers data converted by the SCADA GW processor 404 directly to one or more SCADA devices. The SCADA GW processor 404 is configured to, executing computer-readable instructions stored in a memory associated with the processor 404, facilitate communications between SCADA devices and PDN GWs. In particular, the SCADA GW processor 404 is configured to perform a protocol conversion to facilitate transfer of data between the SCADA devices and the AMI devices in the wireless network via the PDN GWs.

The SCADA GW provisioning manager 406 configures each of at least one connection of the SCADA GW system 400 to at least one SCADA device. For example, the SCADA GW system 400 may have one or multiple connections, each of which is for communicating with a specific SCADA device or group of SCADA devices. Each connection is provisioned by the SCADA GW provisioning manager 406 with parameters, such as connection type, protocols used, addressing parameters (e.g., source and destination addresses), and transmission restrictions, if any.

The SCADA GW security catalog database 410 is a repository that stores security profiles for each SCADA GW connection. Each security profile record contains detailed information about the type of connection, SCADA device characteristics, protocols allowed, addresses allowed, amount of data allowed to be transmitted and/or received, and other relevant information associated with each SCADA device and each connection. The SCADA GW security catalog 410, in some embodiments, is a lightweight directory access protocol (LDAP) database, a relational database, or a proprietary database. Other database types are contemplated.

When a connection is made by a SCADA device to the SCADA GW system 400, the SCADA GW provisioning manager 406 interfaces with the SCADA GW security manager 408 and requests security information. This process may occur each time that a particular SCADA device makes a connection, upon first time connection, or never. The SCADA GW security manager 408 fetches appropriate records from the SCADA GW security catalogue database 410 and forwards this information to the SCADA GW provisioning manager 406 as requested. The SCADA GW provisioning manager 406 then uses this security data and/or the configuration parameters to configure the appropriate SCADA GW connection.

Exemplary Methods

While the processes or methods described herein may, at times, be described in a general context of computer-executable instructions, the present methods, procedures, and processes can also be implemented in combination with other program modules and/or as a combination of hardware and software. The term application, or variants thereof, is used expansively herein to include routines, program modules, programs, components, data structures, algorithms, and the like. Applications can be implemented on various system configurations, including servers, network nodes, single or multiple processor computers, hand-held computing devices, mobile communications devices, microprocessor-based consumer electronics, programmable electronics, network elements, gateways, network functions, devices, combinations thereof, and the like. In particular, the following methods may be executed by a SCADA GW system 400, such as described above.

It should be understood that the steps of the following methods are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated methods can be ended at any time. In certain embodiments, some or all steps of these methods, and/or substantially equivalent steps can be performed by execution of computer-readable instructions stored or included on a non-transitory computer-readable medium of the above-described SCADA GW system 400.

Figure 5:
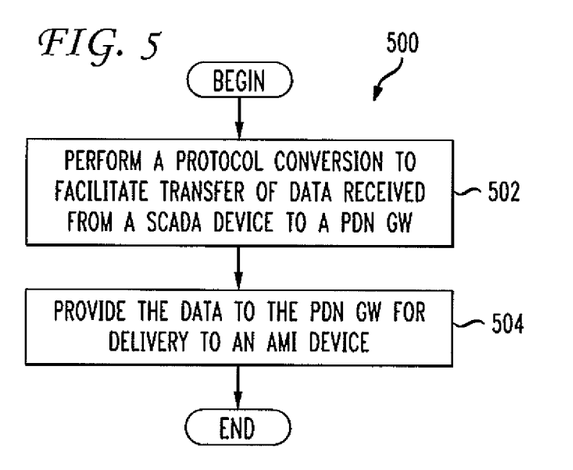
FIG. 5 illustrates a method for facilitating the transfer of data from a SCADA device to an AMI device according to exemplary embodiments.

Referring now to FIG. 5, a method 500 for facilitating the transfer of data from a SCADA device to an AMI device is illustrated, according to one embodiment. The method 500 begins at step 502, at which the SCADA GW system 400, executing computer-readable instructions stored in a memory associated with the processor 404, performs a protocol conversion to facilitate transfer of data received from one or more SCADA devices, such as one or more of the SCADA devices 208 and 308 operating in the SCADA domain 202 and the wireless service provider domain 301, respectively, to one or more PDN GWs, such as one or both of the PDN GWs 212, 304, or others operating in the wireless service provider domains 204, 301, respectively. At step 504, the SCADA GW system 400 provides the data to the one or more PDN GWs for delivery to one or more AMI devices, such as one or more of the AMI devices 124 operating in the AMI domain 122. The PDN GW(s) receiving the data sends the data to the destination AMI device(s) via a wireless communications network, such as one of the wireless communications networks 216, 316.

Figure 6:
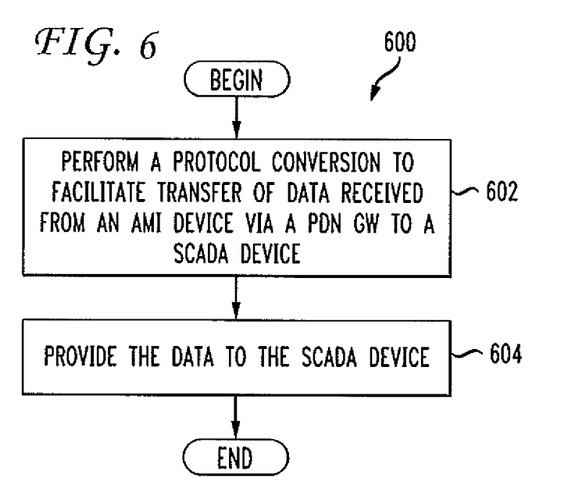
FIG. 6 illustrates a method for facilitating the transfer of data from an AMI device to a SCADA device according to another embodiment.

Referring now to FIG. 6, a method 600 for facilitating the transfer of data from an AMI device to a SCADA device is illustrated, according to another embodiment. The method 600 begins at step 602, at which the SCADA GW system 400 performs a protocol conversion to facilitate transfer of data received from an AMI device via a PDN GW, such as PDN GWs 212, 304, that is in communication with the SCADA GW system 400 to a SCADA device operating in the SCADA domain and/or the wireless domain, such as SCADA devices 208 and 308, respectively. At step 604, the SCADA GW system 400 provides the data to the appropriate SCADA device.

Figure 7:
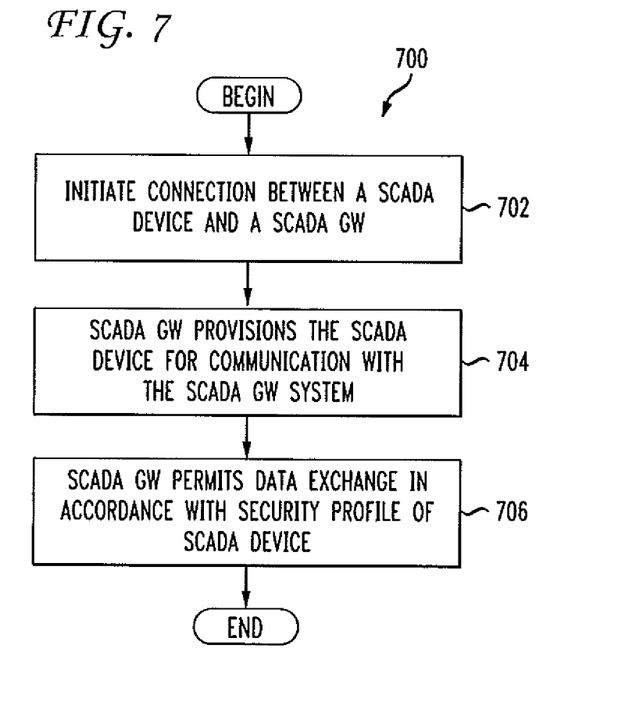
FIG. 7 illustrates a method for provisioning a SCADA device for communications with a SCADA system, according to one embodiment.

Referring now to FIG. 7, a method 700 for provisioning a SCADA device for communications to/from the SCADA GW system 400 is illustrated, according to one embodiment. The method 700 begins at step 702, at which a connection is initiated between a SCADA device, such as one of the SCADA devices 208 operating in the SCADA domain 202 and/or one of the SCADA devices 308 operating in the wireless service provider domain 301, and the SCADA GW system 400. The connection may be initiated by the SCADA device or the SCADA GW system 400. At step 704, the SCADA GW system 400 provisions the SCADA device for communication with the SCADA GW system using configuration parameters and security profile details of the SCADA device. At step 706, the SCADA GW system 400 permits data exchange in accordance with the security profile for the SCADA device. In alternative embodiments, the SCADA GW system 400 provisions the SCADA device using only the configuration parameters. In some embodiments, the security profiles are maintained by an enterprise, the wireless service provider operating the SCADA GW system 400, or a third party, Exemplary Wireless Communications Network Referring now to FIG. 8, an exemplary wireless communications network 800 is illustrated. The wireless communications network 800 shown in FIG. 8 includes not only a packet data network according to, e.g., the LTE standard, but also network elements for other standards, e.g., GSM and UMTS standards. Referring to FIG. 8, the wireless network includes a (System Architecture Evolution Gateway) SAE GW 850 that includes a SCADA GW that performs protocol conversion, such as the SCADA GW 206 and 302, and a PDN GW, such as the PDN GW 212 and 304. As an alternative, the SCADA GW and/or the PDN GW may be implemented as separate components from the SAE GW 850. One or both configurations and multiples thereof may be used in actual implementations. The other components of the wireless communications network 800 are exemplary of those of the wireless communications networks 216, 316 illustrated, respectively, in FIGS. 2 and 3. Details of the wireless communications network 800 are now described.

According to exemplary embodiments, the communications network 800 may include any one or more of various radio access networks (RANs) for enabling communication with wireless devices. For example, the communication network 800 may include RANs dedicated to LTE-based radio network access, such as that illustrated in the bottom right portion of FIG. 8. The communications network 800 may also include additional RANs. For example, the network 800 may include RANs dedicated to GSM-based radio network access, such as that illustrated in the bottom left hand portion of FIG. 8. The network 800 may also include RANs dedicated to UMTS-based radio network access, as illustrated in the middle lower portion of FIG. 8. The innovative aspects of the present disclosure may be implemented in alternative networks that use other access technologies, as described above.

Referring first to the LTE-based RAN, the illustrated communications network 800 is in communication with one or more user devices, e.g., Mobile Stations (MS) 802, AMI devices 124, and SCADA devices 308 via an eNodeB 825 over a radio (air) interface. Each AMI device 124 is in communication with the eNodeB 825 via the AMI device transceiver 126, described above.

In the illustrated embodiment, the MS 802 is a mobile device, and it may be a computer, such as a laptop with an integrated or external, removable access card. The MS 802 includes mobile equipment, such as, but not limited to, one or more of keyboards, screens, touch screens, multi-touch screens, radio transceivers, circuit boards, processors, memory, Subscriber Identity Modules (SIM), Universal SIMs (USIM), or Universal Integrated Circuit Card (UICC) that contains subscriber information to enable network access to the wireless communications network 800, and the like.

Each eNodeB 825 includes a transceiver for exchanging communications via a radio air interface. The eNodeB 825 also hosts functionality for radio resource management (e.g., radio bearer control, radio admission control, connection mobility control, and dynamic allocation of resources to user devices). The eNodeB 825 also includes functionality for IP header compression and encryption of a user data stream, selection of a MME 830 at attachment of a user device, routing of user plane (U-plane) data towards the SAE GW 850, and measurement reporting for mobility and scheduling.

The eNodeB 825 is in communication with the SAE GW 850 for physical packet data transmission via an S1 UP interface. The SAE GW 850 routes and forwards user data packets while also acting as the mobility anchor for the user plane during inter-eNodeB handovers and as the anchor for mobility between the LTE-based network and networks based on other communication standards. The SAE GW 850 includes functionality for termination of U-plane packets and switching of U-plane for support of mobility.

The eNodeB 825 is also in communication with the MME 830 via an S1 CP interface for exchanging control signals. The MME 830 hosts functionality for distributing paging messages to the eNodeB 825, security control, idle state mobility control, SAE bearer control, and the ciphering and integrity portion of Non-access Stratum (NAS) signaling.

Figure 8:
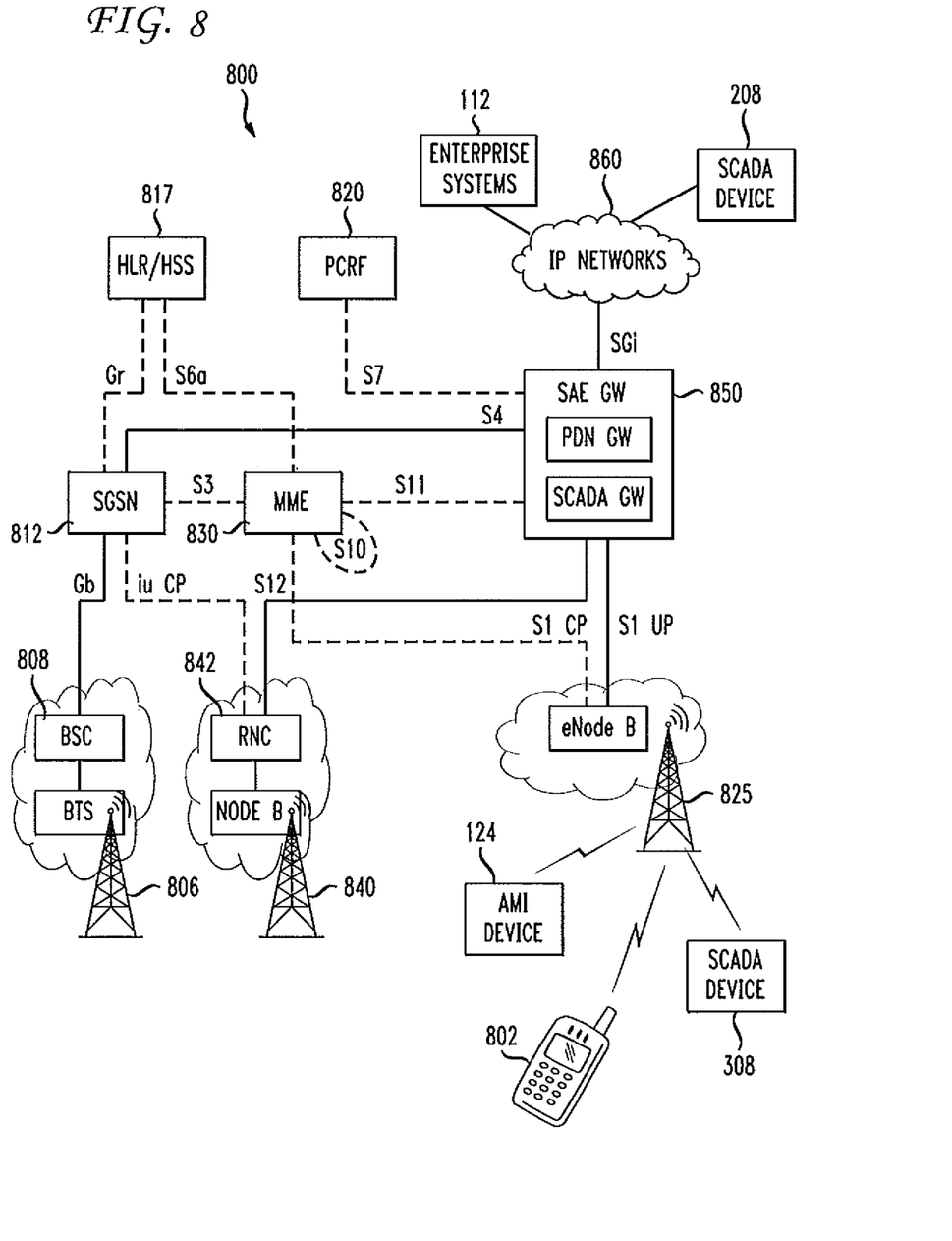
FIG. 8 schematically illustrates a wireless communications network in which some embodiments may be implemented.

In the embodiment illustrated in FIG. 8, the PDN GW in the SAE GW 850 is configured to provide an edge routing function for the packet core network to external packet data networks (PDNs) 860 via the SGi interface. Alternatively, as indicated above, the PDN GW (and the SCADA GW) may be implemented as separate component. The PDNs 860 may include one or more networks and may be in communication with other networks. For example, as shown in FIG. 8, the PDN 860 may include IP networks, such as the Internet, and may be in communication with one or more intranets, for example, enterprise data networks, such as the enterprise systems 112. The PDN GW within the SAE GW 850 is further configured to communicate with the SCADA devices 208 via the SCADA GW and the PDN 860, as described with reference to FIG. 2 above, as well as the SCADA devices 308 via the SCADA GW and the eNodeB 825, as described with reference to FIG. 3 above.

The SAE GW 850 communicates with a Policy and Charging Rules Function (PCRF) 820 via an S7 interface for obtaining QoS policy and accounting criteria.

The MME 830 is in communication with the SAE GW 850 via an S11 interface. Although illustrated as separate components, it should be appreciated that the MME 830 and the SAE GW 850 may be incorporated within the same device.

The MME 830 is in communication with a Home Location Register/Home Subscriber Server (HLR/HSS) 817 via an S6a interface. The HLR/HSS 817 is a database containing user-related and subscription-related information. The HLR/HSS 817 includes functionality for mobility management, call and session establishment support, and user authentication and access authorization.

Although one MME is shown in FIG. 8 for ease of illustration, it should be appreciated that there may be multiple MMEs. In such as case, the MMEs would communicate via an S10 interface for MME relocation and MME to MME information transfer.

The MME 830 is also in communication with a Serving General Packet Radio Service Support Node (SGSN) 812 via an S3 interface. The MME 830 checks the authorization of a user device for access to a server provider's Public Land Mobile Network (PLMN) and enforces roaming restrictions.

As indicated above, the communications network 800 includes LTE-based network elements and/or other network elements, such as GSM-based and UTMS-based elements.

Referring first to the GSM-based network elements, user devices, such as AMI devices, mobile devices, and SCADA devices (not shown for simplicity of illustration), communicate with a BTS 806 via a radio air interface. The BTSs 806 are terminating nodes for the radio interface for the GSM-based RAN. Each BTS 806 includes one or more transceivers and is responsible for ciphering of the radio interface.

Each BTS 806 is in communication with a Base Station Controller (BSC) 808. The BSC 808 is configured to allocate radio resources to the mobile station and AMI devices, administer frequencies, and control handovers between BTSs 806. Although illustrated as a distinct element, the functions provided by the BSC 808 may alternatively be incorporated in the BTS 806.

The BSC 808 communicates with the SGSN 812 via the Gb interface. The SGSN 812 records and tracks the location of each mobile device and AMI device (although AMI devices are in some cases stationary) in the wireless communications network 800. The SGSN 812 also provides security functions and access control functions.

The SGSN 812 is, in turn, in communication with the HLR/HSS 817 via a Gr interface. As indicated above, the HLR/HSS 817 is a database configured to provide routing information for mobile terminated calls and various messaging communications. The HLR/HSS 817 is also configured to maintain subscriber data that is distributed to the SGSN 812 and the MME 830 and to provide mobility management procedures, such as location area and routing area updates.

The SGSN 812, in turn, is in communication with one or more SAE GWs, such as the SAE GW 850 (including the SCADA GW and the PDN GW) via the S4 interface.

The third RAN, illustrated in the middle lower portion of FIG. 8, is dedicated to UMTS-based network access and is now described. This RAN includes a Node B 840 that is in communication with user devices, such as mobile stations, AMI devices, and SCADA devices (not shown explicitly for simplicity of illustration) via a radio (air) interface. The Node B 840 is the terminating node for the radio interface in the third RAN. Each Node B 840 includes one or more transceivers for transmission and reception of data across the radio interface. Each Node B 840 is configured to apply the codes to describe channels in a CDMA-based UMTS network. Generally, the Node B 840 performs similar functions for the UMTS network that the BTS 806 performs for the GSM network.

Each Node B 840 is in communication with a Radio Network Controller (RNC) 842. The RNC 842 is configured to allocate radio resources to the user device, administer frequencies, and control handovers between Node Bs 840 (and others not shown). Although illustrated as a distinct element, the RNC 842 functions may alternatively be located within the Node Bs 840. Generally, the RNC 842 performs similar functions for the UMTS network that the BSC 808 performs for the GSM network.

The RNC 842 is in communication with the SAE GW 850 via an S12 interface. The RNC 842 is also in communication with the SGSN 812 via an iu-CP interface. The other network elements perform the same functions for the UMTS network as described above for the GSM network.

It should be appreciated that descriptions of the GSM-based and UTMS-based network configurations are simplified, and that traditional components included in GSM-based and UTMS-based architecture, e.g., a Mobile Switching Center (MSC) and other components, may be included for wireless communications with, e.g., a Public Switched Telephone Network (PSTN) and an Integrated Services Digital Network (ISDN).

The law does not require, and it is economically prohibitive, to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A supervisory control and data acquisition gateway comprising:

a processor; and a memory that stores instructions that, when executed by the processor, cause the processor to perform operations comprising:

selecting, in response to initiation of a connection between the supervisory control and data acquisition gateway and a supervisory control and data acquisition device associated with an enterprise system operating in a first network, a security profile associated with the supervisory control and data acquisition device, the security profile comprising information specific to the supervisory control and data acquisition device for configuring the connection between the supervisory control and data acquisition gateway and the supervisory control and data acquisition device to transfer, via the supervisory control and data acquisition gateway, data associated with a first protocol from the supervisory control and data acquisition device to an advanced metering infrastructure device connected to a second network, wherein the data from the supervisory control and data acquisition device is for performing at least one of monitoring or controlling the advanced metering infrastructure device connected to the second network, wherein the supervisory control and data acquisition gateway operates within the second network, wherein the advanced metering infrastructure device communicates with the second network using a second protocol associated with the second network, and wherein the second protocol is different from the first protocol, provisioning, using the information of the security profile, the connection between the supervisory control and data acquisition gateway and the supervisory control and data acquisition device, and initiating, in response to the connection between the supervisory control and data acquisition gateway and the supervisory control and data acquisition device being provisioned, a transfer of the data, via the supervisory control and data acquisition gateway, from the supervisory control and data acquisition device to the advanced metering infrastructure device connected to the second network without traversing the first network, wherein initiating the transfer of the data from the supervisory control and data acquisition device to the advanced metering infrastructure device without traversing the first network comprises transferring the data received from the supervisory control and acquisition device to a packet data network gateway associated with the second network for delivery of the data, via the packet data network gateway, to the advanced metering infrastructure device connected to the second network, and wherein the packet data network gateway associated with the second network comprises functionality provided by the supervisory control and data acquisition gateway for communicating the data to the advanced metering infrastructure device connected to the second network without traversing the first network.

2. The supervisory control and data acquisition gateway of claim 1, wherein the information of the security profile comprises a connection type supported by the supervisory control and data acquisition device, a protocol type supported by the supervisory control and data acquisition device, and an address of the supervisory control and data acquisition device.

3. The supervisory control and data acquisition gateway of claim 1, wherein initiating the transfer of the data from the supervisory control and data acquisition device to the advanced metering infrastructure device without traversing the first network further comprises converting the data from the first protocol to the second protocol, wherein the first protocol is one used by the supervisory control and data acquisition device and the second protocol is one used by the packet data network gateway.

4. The supervisory control and data acquisition gateway of claim 3, wherein converting the data from the first protocol to the second protocol comprises performing a data link layer protocol conversion.

5. The supervisory control and data acquisition gateway of claim 1, wherein initiating the transfer of the data between the supervisory control and data acquisition device and the advanced metering infrastructure device without traversing the first network further comprises converting the data from the first protocol to the second protocol, and wherein the enterprise system is associated with an enterprise that uses the supervisory control and data acquisition device for monitoring and controlling remote assets.

6. The supervisory control and data acquisition gateway of claim 5, wherein converting the data from the first protocol to the second protocol comprises performing a data link layer protocol conversion.

7. The supervisory control and data acquisition gateway of claim 5, wherein the second protocol is associated with an Internet protocol suite.

8. The supervisory control and data acquisition gateway of claim 1, wherein the operations further comprise provisioning the supervisory control and data acquisition device in accordance with the information of the security profile.

9. A method comprising:
selecting, by a supervisory control and data acquisition gateway comprising a processor, in response to initiation of a connection between the supervisory control and data acquisition gateway and a supervisory control and data acquisition device associated with an enterprise system operating in a first network, a security profile associated with the supervisory control and data acquisition device, the security profile comprising information specific to the supervisory control and data acquisition device for configuring the connection between the supervisory control and data acquisition gateway and the supervisory control and data acquisition device to transfer, via the supervisory control and data acquisition gateway, data associated with a first protocol from the supervisory control and data acquisition device to an advanced metering infrastructure device connected to a second network, wherein the data from the supervisory control and data acquisition device is for performing at least one of monitoring or controlling the advanced metering infrastructure device connected to the second network, wherein the supervisory control and data acquisition gateway operates within the second network, wherein the advanced metering infrastructure device communicates with the second network using a second protocol associated with the second network, and wherein the second protocol is different from the first protocol;
provisioning, by the supervisory control and data acquisition gateway, using the information of the security profile, the connection between the supervisory control and data acquisition gateway and the supervisory control and data acquisition device; and
initiating, by the supervisory control and data acquisition gateway, in response to the connection between the supervisory control and data acquisition gateway and the supervisory control and data acquisition device being provisioned, a transfer of the data, via the supervisory control and data acquisition gateway, from the supervisory control and data acquisition device to the advanced metering infrastructure device connected to the second network without traversing the first network, wherein initiating the transfer of the data from the supervisory control and data acquisition device to the advanced metering infrastructure device without traversing the first network comprises transferring the data received from the supervisory control and acquisition device to a packet data network gateway associated with the second network for delivery of the data, via the packet data network gateway, to the advanced metering infrastructure device connected to the second network, and wherein the packet data network gateway associated with the second network comprises functionality provided by the supervisory control and data acquisition gateway for communicating the data to the advanced metering infrastructure device connected to the second network without traversing the first network.

10. The method of claim 9, wherein the information of the security profile comprises a connection type supported by the supervisory control and data acquisition device, a protocol type supported by the supervisory control and data acquisition device, and an address of the supervisory control and data acquisition device.

11. The method of claim 9, wherein initiating the transfer of the data from the supervisory control and data acquisition device to the advanced metering infrastructure device without traversing the first network further comprises converting the data from the first protocol to the second protocol, wherein the first protocol is one used by the supervisory control and data acquisition device and the second protocol is one used by the packet data network gateway, and wherein the enterprise system is associated with an enterprise that uses the supervisory control and data acquisition device for monitoring and controlling remote assets.

12. The method of claim 11, wherein converting the data comprises performing a data link layer protocol conversion.

13. The method of claim 11, wherein the second protocol is associated with an Internet protocol suite.

14. The method of claim 9, further comprising provisioning the supervisory control and data acquisition device in accordance with the information of the security profile.

15. A computer-readable storage device comprising instructions that, when executed by a processor of a supervisory control and data acquisition gateway, cause the processor to perform operations comprising:
selecting, in response to initiation of a connection between the supervisory control and data acquisition gateway and a supervisory control and data acquisition device associated with an enterprise system operating in a first network, a security profile associated with the supervisory control and data acquisition device, the security profile comprising information specific to the supervisory control and data acquisition device for configuring the connection between the supervisory control and data acquisition gateway and the supervisory control and data acquisition device to transfer, via the supervisory control and data acquisition gateway, data associated with a first protocol from the supervisory control and data acquisition device to an advanced metering infrastructure device connected to a second network, wherein the data from the supervisory control and data acquisition device is for performing at least one of monitoring or controlling the advanced metering infrastructure device connected to the second network, wherein the supervisory control and data acquisition gateway operates within the second network, wherein the advanced metering infrastructure device communicates with the second network using a second protocol associated with the second network, and wherein the second protocol is different from the first protocol;

provisioning, using the information of the security profile, the connection between the supervisory control and data acquisition gateway and the supervisory control and data acquisition device; and initiating, in response to the connection between the supervisory control and data acquisition gateway and the supervisory control and data acquisition device being provisioned, a transfer of the data, via the supervisory control and data acquisition gateway, from the supervisory control and data acquisition device to the advanced metering infrastructure device connected to the second network without traversing the first network, wherein initiating the transfer of the data from the supervisory control and data acquisition device to the advanced metering infrastructure device without traversing the first network comprises transferring the data received from the supervisory control and acquisition device to a packet data network gateway associated with the second network for delivery of the data, via the packet data network gateway, to the advanced metering infrastructure device connected to the second network, and wherein the packet data network gateway associated with the second network comprises functionality provided by the supervisory control and data acquisition gateway for communicating the data to the advanced metering infrastructure device connected to the second network without traversing the first network.

16. The computer-readable storage device of claim 15, wherein initiating the transfer of the data from the supervisory control and data acquisition device to the advanced metering infrastructure device further comprises converting the data from the first protocol to the second protocol, wherein the first protocol is one used by the supervisory control and data acquisition device and the second protocol is one used by the packet data network gateway.

17. The computer-readable storage device of claim 15, wherein the information of the security profile comprises a connection type supported by the supervisory control and data acquisition device, a protocol type of the supervisory control and data acquisition device, a source address, a destination address, and a transmission restriction.

18. The computer-readable storage device of claim 15, wherein initiating the transfer of the data between the supervisory control and data acquisition device and the advanced metering infrastructure device further comprises converting the data from the first protocol to the second protocol, and wherein the enterprise system is associated with an enterprise that uses the supervisory control and data acquisition device for monitoring and controlling remote assets.

19. The computer-readable storage device of claim 18, wherein converting the data comprises performing a data link layer protocol conversion.

20. The computer-readable storage device of claim 18, wherein the second protocol is associated with an Internet protocol suite.

* * * * *